(12) United States Patent  (10) Patent No.: US 8,812,199 B2
Maegawa  (45) Date of Patent: Aug. 19, 2014

(54) METHOD FOR LEARNING REFERENCE POSITION FOR TRANSMISSION AND VEHICLE

(75) Inventor: Takamichi Maegawa, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 782 days.

(21) Appl. No.: 13/126,477

(22) PCT Filed: Jul. 15, 2009

(86) PCT No.: PCT/JP2009/062780
§ 371 (c)(1),
(2), (4) Date: Apr. 28, 2011

(87) PCT Pub. No.: WO2010/050275
PCT Pub. Date: May 6, 2010

(65) Prior Publication Data
US 2011/0208393 A1    Aug. 25, 2011

(30) Foreign Application Priority Data

Oct. 29, 2008  (JP) ................................ 2008-278769
Oct. 29, 2008  (JP) ................................ 2008-278773

(51) Int. Cl.
*G06F 7/00*       (2006.01)
*F16H 61/00*      (2006.01)
*F16H 61/06*      (2006.01)
*F16H 61/02*      (2006.01)
*B60W 10/11*      (2012.01)
*F16H 59/44*      (2006.01)
*B60W 10/06*      (2006.01)
*F16H 61/682*     (2006.01)
*F16H 59/08*      (2006.01)

(52) U.S. Cl.
CPC .............. *F16H 61/00* (2013.01); *F16H 61/061* (2013.01); *F16H 61/0213* (2013.01); *B60W 10/11* (2013.01); *F16H 59/44* (2013.01); *B60W 10/06* (2013.01); *F16H 61/682* (2013.01); *F16H 2059/086* (2013.01); *F16H 2061/0087* (2013.01); *F16H 2061/064* (2013.01); *F16H 2342/04* (2013.01)
USPC ............................................. 701/51; 318/652

(58) Field of Classification Search
CPC ... F16H 61/0213; F16H 61/061; F16H 59/44; B60W 10/06; B60W 10/11
USPC ......... 318/561, 634, 652, 701, 466, 468, 471, 318/432, 431, 400.4, 400.28; 477/45, 156; 123/399, 403; 474/28, 18; 701/51
See application file for complete search history.

(56) References Cited

U.S. PATENT DOCUMENTS 5,626,534 A    5/1997 Ashley et al.
7,005,814 B2 *  2/2006 Nakai et al. ............... 318/400.28
(Continued)

FOREIGN PATENT DOCUMENTS

JP    8-508816    9/1996
JP    11-210875   8/1999
(Continued)

*Primary Examiner* — Behrang Badii
(74) *Attorney, Agent, or Firm* — Rankin, Hill & Clark LLP

(57) ABSTRACT

A method for allowing a controller of a transmission to learn a reference position of the transmission and a vehicle for which this method can be executed. By the method, when the shift lever is subjected to a predetermined input operation, the controller starts learning a reference position (for example, the gear end, the synchronization end, or the clutch engagement position) of the transmission.

10 Claims, 13 Drawing Sheets

(56) References Cited

U.S. PATENT DOCUMENTS

| | | | |
|---|---|---|---|
| 7,143,743 B2* | 12/2006 | Uda et al. | 123/399 |
| 7,161,314 B2* | 1/2007 | Nakai et al. | 318/400.4 |
| 2005/0110449 A1 | 5/2005 | Yasui et al. | |
| 2005/0230216 A1 | 10/2005 | Kouno et al. | |
| 2005/0267618 A1 | 12/2005 | Kano et al. | |
| 2007/0093356 A1* | 4/2007 | Izumi et al. | 477/45 |
| 2008/0001568 A1* | 1/2008 | Hori et al. | 318/652 |
| 2009/0091284 A1* | 4/2009 | Isobe et al. | 318/561 |

FOREIGN PATENT DOCUMENTS

| | | |
|---|---|---|
| JP | 11-247991 | 9/1999 |
| JP | 2005-201394 | 7/2005 |
| JP | 2007-154921 | 6/2007 |

* cited by examiner

METHOD FOR LEARNING REFERENCE POSITION FOR TRANSMISSION AND VEHICLE

TECHNICAL FIELD

The present invention relates to a method of learning reference positions for a transmission in order to cause a control device of the transmission to learn reference positions for the transmission. The present invention also relates to a vehicle in which such a learning method is carried out.

BACKGROUND ART

When vehicles are manufactured, it has been the usual practice to produce a plurality of units, which will make up the vehicles, separately in a unit factory, and to assemble the completed units integrally into vehicles in a vehicle assembly factory. Among such units, an automatic transmission is completed when an automatic transmission main body and an electronic control device, which are separately manufactured, are assembled together into a vehicle body.

The automatic transmission main body is made up of mechanical components and electric components such as sensors. Since the mechanical components suffer shape variations and the electric components suffer from characteristic variations, it is customary to acquire characteristic values of units to be controlled in an inspection process, and to enter the characteristic values into the control device for achieving a prescribed transmission performance (see U.S. Patent Application Publication No. 2005/0267618). According to U.S. Patent Application Publication No. 2005/0267618, a control facility in the unit factory is electrically connected to an automatic transmission main body, and the control facility controls the automatic transmission main body in order to acquire the characteristic values (see paragraph [0051] of U.S. Patent Application Publication No. 2005/0267618).

An automated manual transmission (AMT: Automated Manual Transmission) is made up of units, which operate in a ganged relation in order to automatically change gear positions. With such an automated manual transmission, it is necessary to learn characteristic values (reference positions including a gear end, a synchronous position, a clutch-engaged position, etc.) for the transmission with the units thereof being assembled together in a vehicle (for AMTs, reference should be made to U.S. Patent Application Publication No. 2005/0110449, U.S. Patent Application Publication No. 2005/0230216, and Japanese Laid-Open Patent Publication No. 2005-201394).

SUMMARY OF INVENTION

For learning characteristic values of a transmission, such as an AMT after units thereof have been assembled in a vehicle body, when the control facility in the unit factory is electrically connected to the transmission, as disclosed in U.S. Patent Application Publication No. 2005/0267618, it is troublesome to install and dismount the transmission, and the control facility suffers locational limitations because the transmission is assembled in the vehicle body. Furthermore, it is necessary to provide the transmission with a connector, which can be connected to the control facility while the transmission is assembled in the vehicle body. Even if a portable tester were connected to the transmission, problems that arise out of installing and dismounting the transmission, and the need to provide the transmission with the connector, still will not be solved.

The present invention has been made in view of the aforementioned problems. It is an object of the present invention to provide a method of learning reference positions for a transmission through a simple process, as well as to provide a vehicle that makes use of such a method.

According to the present invention, there is provided a method of learning a reference position for a transmission with a control unit of the transmission, comprising the steps of carrying out a process of learning the reference position after the transmission has been assembled in a vehicle body, and starting to learn the reference position in the control unit when an operator makes a prescribed input action on a gear shift command input unit through which a gear shift command is manually entered, in the process of learning the reference position.

According to the present invention, when the operator makes a prescribed input action on the gear shift command input unit (e.g., a shift lever) through which a gear shift command is manually entered, the reference position starts to be learned in the control unit. Generally, the gear shift command input unit is positioned so as to be capable of being easily operated by the driver. Therefore, the operator can have the reference position learned through a simple process. As a result, compared with the process of learning a reference position using a control facility in a factory or with a portable tester connected to the vehicle, the man-hours required for the learning process can be reduced, since the transmission does not need to be installed and dismounted. Further, the degree of freedom in design is improved, because it is not necessary for the transmission to have a connector.

The gear shift command input unit may comprise a shift lever, wherein the reference position starts to be learned when the shift lever is moved along a prescribed path. Since the shift lever can stop at a plurality of positions, a comparatively large number of paths can be established along which the shift lever is capable of moving. Therefore, when a plurality of reference positions are learned, it is possible to have paths that correspond to the respective learning processes, with the result that the operator can easily distinguish between respective details of the learning processes.

The reference position may be prohibited from being learned again when learning of the reference position has ended. Consequently, even though operations of the gear shift command input unit that are used in driving the vehicle are used as the prescribed input action, there is no possibility that the reference position will be rewritten while the driver drives the vehicle.

The reference position may be prohibited from being learned again by rewriting a program for learning the reference position after learning of the reference position has ended. Accordingly, the reference position is prevented from being rewritten in error after the reference position has been learned.

A display unit for indicating the position of the shift lever may be blinked while the process of learning the reference position is being prepared, the display unit may be turned on when preparation of the process of learning the reference position has ended, the display unit may be blinked while the process of learning the reference position is being performed, and the display unit may be turned on when the process of learning the reference position has ended. Therefore, the progress of the learning processes is indicated to the operator in a simple manner. Since the display unit, which indicates the position of the shift lever, is used to indicate to the operator the progress of the learning processes, the progress of the learning processes can be indicated to the operator without causing the operator to feel any sense of discomfort.

At least a first reference position and a second reference position may be learned in the process of learning the reference position, in which case a hand brake may be required to be applied and an ignition switch may be required to be turned on while the shift lever is in a neutral position, as conditions for starting a process of learning the first reference position, and the hand brake and a foot brake may be required to be applied and the ignition switch may be required to be turned on while the shift lever is in the neutral position, as conditions for starting a process of learning the second reference position after the process of learning the first reference position. Therefore, the conditions for starting the process of learning the second reference position are the same as the conditions for starting the process of learning the first reference position, with the additional condition that the foot brake must be applied. Consequently, the operational procedure is not unduly complex, and management of the process is easy to carry out.

In the process of learning the first reference position, a gear end may be learned at which gears of the transmission are completely in mesh with each other while an engine is not in operation. In the process of learning the second reference position, a synchronous position may be learned at which the engine and the gears start rotating in synchronism with each other while the engine is in operation. Accordingly, a gear end can be learned while the hand brake is applied to make the vehicle stable, and a synchronous position can be learned while the hand brake and the foot brake are applied, thus making the vehicle more stable.

A display unit for indicating the position of the shift lever may be blinked while the process of learning the first reference position and the process of learning the second reference position are being prepared, the display unit may be turned on when preparation of the process of learning the first reference position and the process of learning the second reference position have ended, the display unit may be blinked while the process of learning the first reference position and the process of learning the second reference position are being performed, and the display unit may be turned on when the process of learning the first reference position and the process of learning the second reference position have ended. Further, in the process of learning the second reference position, segments of the display unit that are not used in the process of learning the first reference position may be used. Therefore, the progress of the learning processes is indicated to the operator in a simple manner. Since the display unit, which indicates the position of the shift lever, is used to indicate to the operator the progress of the learning processes, the progress of the learning processes can be indicated to the operator without causing the operator to feel any sense of discomfort. Further, inasmuch as the segments of the display unit, which are not used in the process of learning the first reference position, are used in the process of learning the second reference position, the operator can recognize easily that the process of learning the first reference position has ended.

The reference position may start to be learned when the shift lever is moved in order from a neutral position, to a reverse gear position, and to the neutral position. Generally, the operator finds it more difficult to move the shift lever into the reverse gear position than into ordinary drive gear positions, such as a first gear position, a second gear position, etc. For this purpose, the condition of moving the shift lever into the reverse gear position can require the operator to have a higher level of recognition when making the operation.

A plurality of reference positions may be learned in the process of learning the reference position. After learning of a first reference position has ended, the first reference position may be prohibited from being learned. Further, an indication may be given that a second reference position should be learned if conditions for starting a process of learning the first reference position are satisfied, even though learning of the first reference position has ended. Consequently, once learning of the first reference position has ended, the first reference position is prohibited from being learned again, so that the first reference position is prevented from being rewritten unintentionally. If a learning process that has already ended is requested, then a next learning process to be performed is indicated to the operator, thereby prompting the operator to carry out the indicated learning process.

A vehicle according to the present invention incorporates a program for carrying out the above method of learning the reference position for a transmission.

DESCRIPTION OF EMBODIMENTS

Figure 1:
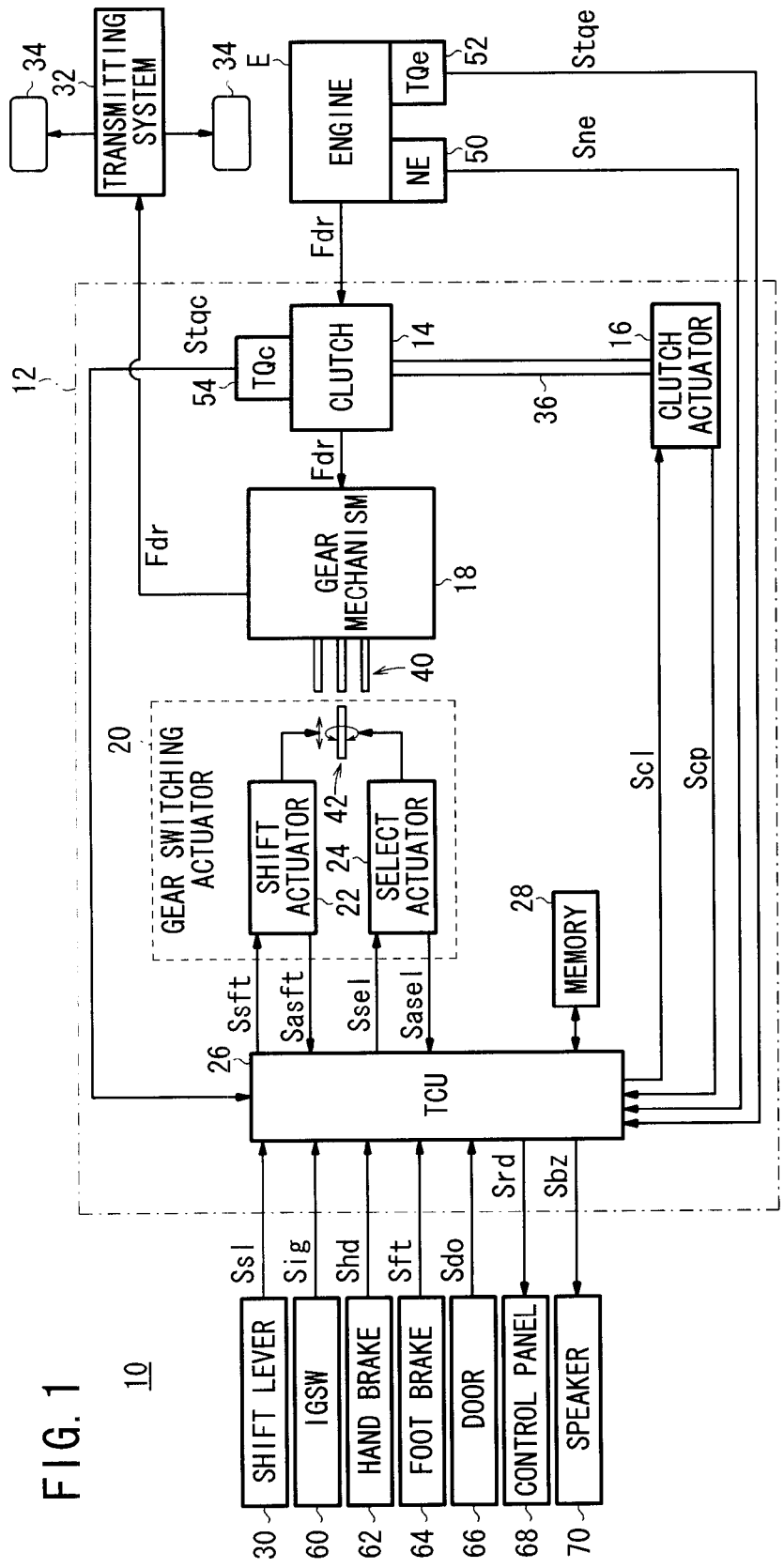
FIG. 1 is a schematic diagram of a vehicle according to an embodiment of the present invention.

FIG. 1 is a diagram showing a general arrangement of a vehicle 10 according to an embodiment of the present invention. The vehicle 10 includes a transmission 12, which principally comprises a clutch 14, a clutch actuator 16, a gear mechanism 18, a gear switching actuator 20 comprising a shift actuator 22 and a select actuator 24, and a transmission control unit 26 {hereinafter referred to as a "TCU 26" (TCU: Transmission Control Unit)}.

According to the present embodiment, the above components of the transmission 12 are manufactured as units in a unit factory, and then are assembled into a vehicle body (not shown) of the vehicle 10 in an assembly factory. FIG. 1 shows the assembled vehicle 10.

The transmission 12 comprises an automated manual transmission (AMT: Automated Manual Transmission). The transmission 12 automatically operates the clutch (engages and disengages the clutch), and shifts gears depending on operations of a shift lever 30 by the driver (manual gear shifting mode). The transmission 12 according to the present embodiment also is capable of automatically operating the clutch and shifting gears without the driver having to operate the shift lever 30 (automatic gear shifting mode).

On the vehicle 10, a drive force Fdr from an engine E is transmitted through the clutch 14 to the gear mechanism 18. The drive force Fdr, which is transmitted to the gear mechanism 18, is transmitted through a transmission system 32 to drive wheels 34.

The clutch actuator 16 is connected to the clutch 14 through a hydraulic pressure pipe 36. The clutch actuator 16 controls clutch operations of the clutch 14 in response to commands (clutch operation signal Scl) from the TCU 26. The clutch 14 sends a clutch position signal Scp, which is indicative of the position of a pressure plate (not shown) with respect to a flywheel (not shown) of the engine E, to the TCU 26.

The gear mechanism 18 has a plurality of gears, not shown, and is capable of shifting the gears. The gear mechanism 18 also has a plurality of shift forks 40, to which a shift arm 42 of the gear switching actuator 20 is connected, depending on a selected gear position. The shift arm 42 is caused by the shift actuator 22 to carry out a shifting action (a horizontal movement in FIG. 1), and also is caused by the select actuator 24 to carry out a selecting action (a rotation about the axis of the shift arm 42). Based on a command (shifting action signal Ssft) from the TCU 26, the shift actuator 22 causes the shift arm 42 to carry out the shifting action. The shift actuator 22 detects a distance (shifting distance Asft) [mm] that the shift arm 42 has moved in a shifting direction by means a position sensor (not shown) disposed in the shift actuator 22, and the shift actuator 22 sends a shifting distance signal Sasft indicative of the shifting distance Asft to the TCU 26. Based on a command (selecting action signal Ssel) from the TCU 26, the select actuator 24 causes the shift arm 42 to carry out the selecting action. The select actuator 24 detects a distance (selecting distance Asel) [θ] that the shift arm 42 has moved in a selecting direction by means a position sensor (not shown) disposed in the select actuator 24, and the select actuator 24 sends a selecting distance signal Sasel indicative of the shifting distance Asel to the TCU 26.

The TCU 26 controls the clutch actuator 16, the shift actuator 22, and the select actuator 24 (as described in detail later). A memory 28 is connected to the TCU 26. The memory 28 stores therein in a rewritable manner a gear end learning program, a synchronous position learning program, and a clutch-engaged position learning program.

The transmission 12 is basically constructed and operates as disclosed in U.S. Patent Application Publication No. 2005/0110449, U.S. Patent Application Publication No. 2005/0230216, and Japanese Laid-Open Patent Publication No. 2005-201394, for example.

According to the present embodiment, the vehicle 10 also includes an engine rotational speed sensor 50, an engine torque sensor 52, and a clutch torque sensor 54. The engine rotational speed sensor 50 detects a rotational speed [rpm] of the engine E (engine rotational speed NE), and sends an engine rotational speed signal Sne, which is indicative the engine rotational speed NE, to the TCU 26. The engine torque sensor 52 detects a torque [N] of the engine E (engine torque TQe), and sends an engine torque signal Stqe, which is indicative of the engine torque TQe, to the TCU 26. The clutch torque sensor 54 detects a torque [N] applied to the clutch 14 (clutch torque TQc), and sends a clutch torque signal Stqc, which is indicative of the clutch torque TQc, to the TCU 26.

According to the present embodiment, the TCU 26 is electrically connected to the shift lever 30, an ignition switch 60 (hereinafter referred to as an "IGSW 60"), a hand brake 62, a foot brake 64, a door 66, a control panel 68, and a speaker 70.

The shift lever 30 sends a shift lever signal Ssl, which is indicative of a selected gear position, to the TCU 26. The IGSW 60 sends an ignition signal Sig, which is indicative of an off position, an accessory position, or an on position selected thereby, to the TCU 26. The hand brake 62 sends a hand brake signal Shd, which is indicative of whether or not the hand brake 62 has been operated, to the TCU 26. The foot brake 64 sends a foot brake signal Sfb, which is indicative of whether or not the foot brake 64 has been operated, to the TCU 26. The door 66 sends a door signal Sdo, which is indicative of whether or not the door 66 is open, to the TCU 26. The control panel 68 displays information depending on a command (display command signal Srd) from the TCU 26. The speaker 70 outputs a sound (buzzer sound, voice, etc.) depending on a command (sound output command signal Sbz) from the TCU 26.

Figure 2:
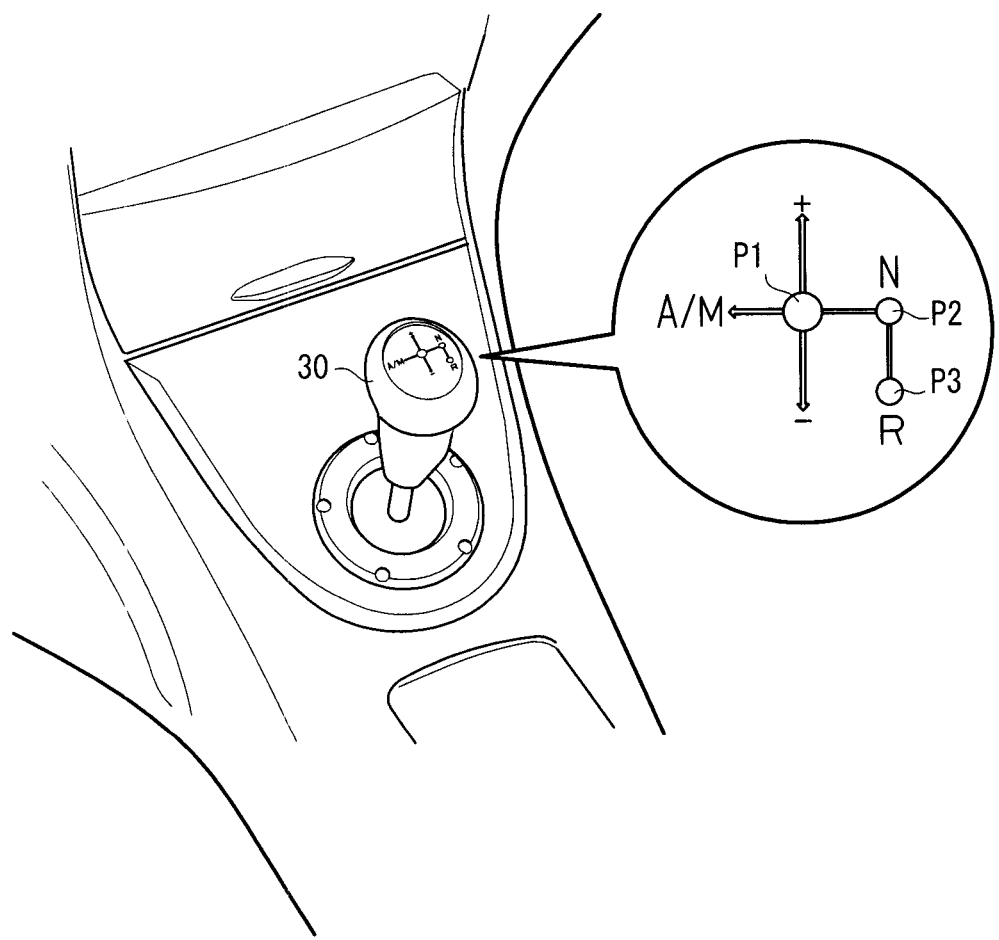
FIG. 2 is a view showing an appearance of a shift lever according to the embodiment.

FIG. 2 shows an appearance of the shift lever 30 according to the present embodiment. As shown in FIG. 2, the shift lever 30 is in a position P1 when the vehicle 10 is driven. Each time that the shift lever 30 is moved toward "+", the gear mechanism 18 is shifted into a higher gear position. Conversely, each time that the shift lever 30 is moved toward "−", the gear mechanism 18 is shifted into a lower gear position. Each time the shift lever 30 is moved toward "A/M", the gear mechanism 18 switches between a manual gear shifting mode and an automatic gear shifting mode. The shift lever 30 can be fixed in the position P1, a neutral position P2, and a reverse gear position P3. However, the shift lever 30 automatically returns to the position P1 when the shift lever 30 has been moved to "+", "−", or "A/M".

Figure 3:
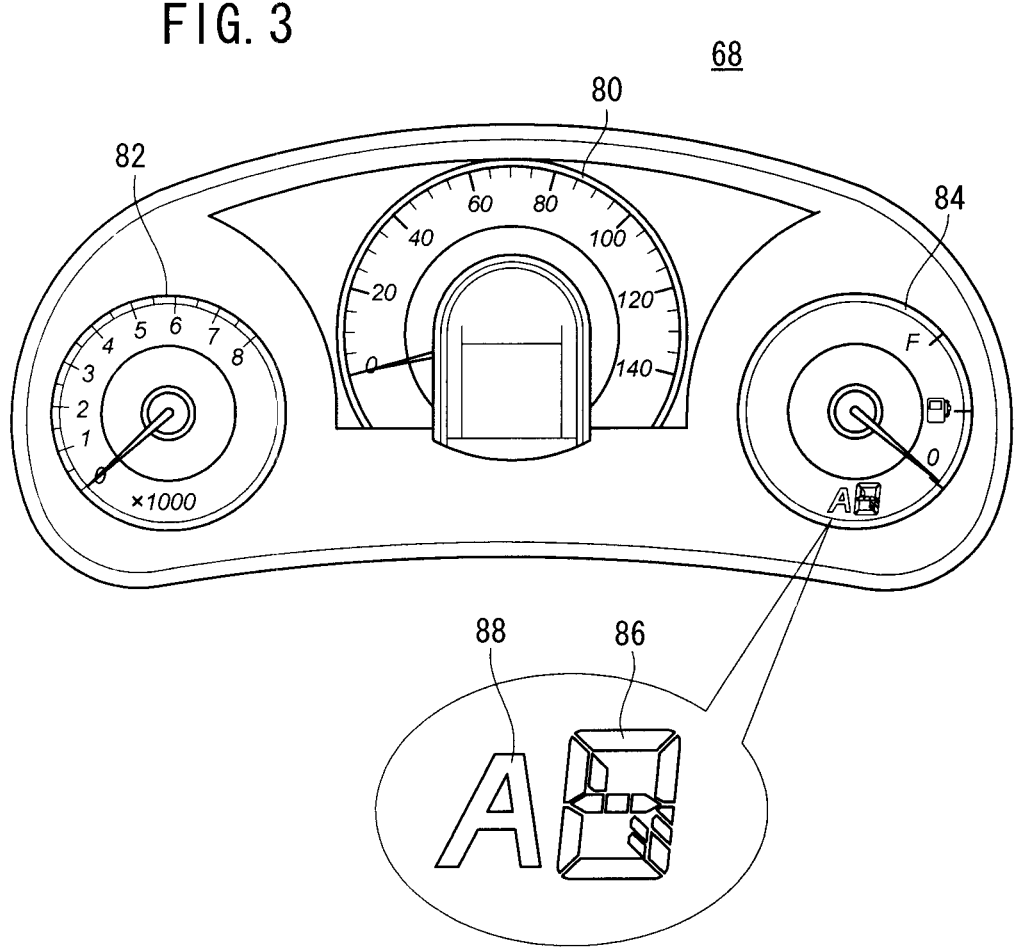
FIG. 3 is a view showing an appearance of a control panel according to the embodiment.

FIG. 3 shows an appearance of the control panel 68 according to the present embodiment. As shown in FIG. 3, the control panel 68 includes a speed display unit 80, an engine rotational speed display unit 82, and a remaining fuel display unit 84. The control panel 68 also includes, in a region below the remaining fuel display unit 84, a gear position display unit 86 for displaying a selected gear position, and an automatic gear shifting mode display unit 88 for displaying whether the automatic gear shifting mode has been selected. The automatic gear shifting mode display unit 88 is turned on when the automatic gear shifting mode is selected, and is turned off when the automatic gear shifting mode is not selected. According to the present embodiment, when the TCU 26 learns reference positions for the transmission 12, the gear position display unit 86 and the automatic gear shifting mode display unit 88 also are used to indicate the progress of the learning process (to be described in detail later).

Figure 4:
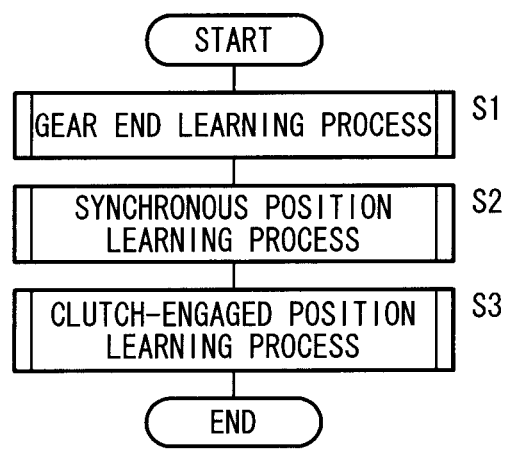
FIG. 4 is a flowchart of a process for learning reference positions for a transmission.

FIG. 4 is a flowchart of a process for learning reference positions for the transmission 12, components of which are assembled in the vehicle body of the vehicle 10.

In step S1, the TCU 26 performs a gear end learning process for learning a gear end for each gear position. The gear end refers to a position in which the shift forks 40 are completely connected to the shift arm 42 and the gears in the gear mechanism 18 are connected (a position in which the shift arm 42 will not move further toward the shift forks 40, even if the shift actuator 22 and the select actuator 24 are operated under the same conditions).

In step S2, the TCU 26 performs a synchronous position learning process in order to learn a synchronous position for each gear position. The synchronous position refers to a position in which the shift forks 40 and the shift arm 42 start to come into contact with each other.

In step S3, the TCU 26 performs a clutch-engaged position learning process in order to learn a clutch-engaged position. The clutch-engaged position refers to a position in which the clutch 14 is connected to the engine E.

Figure 5:
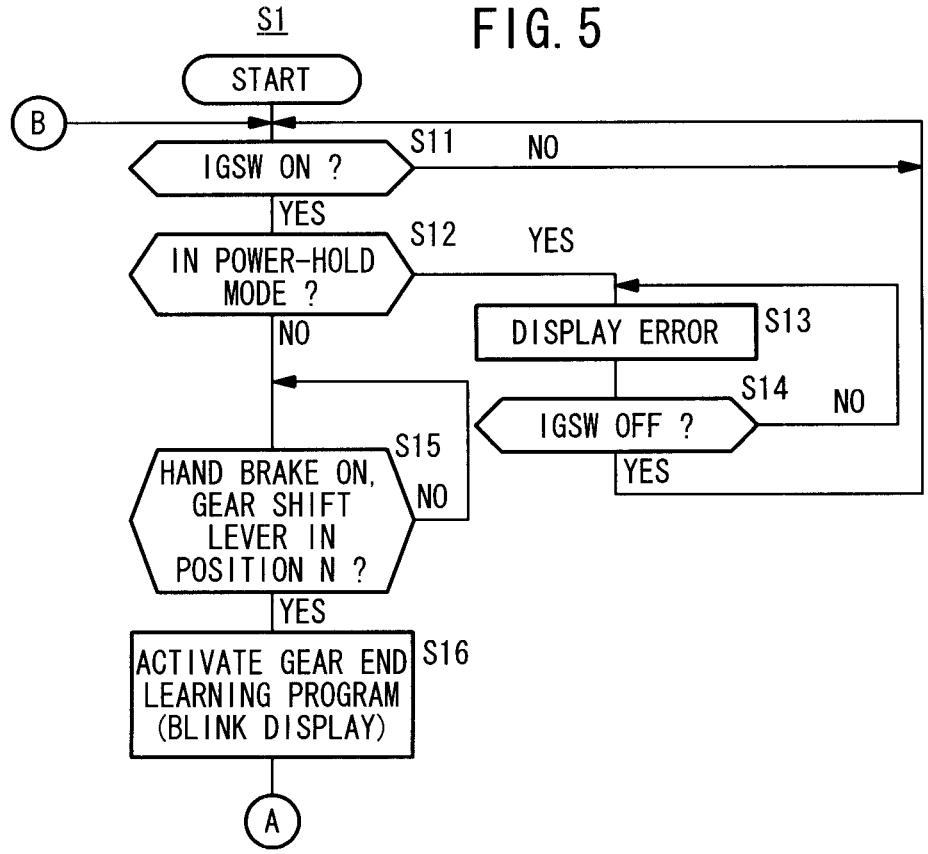
FIG. 5 is a detailed flowchart of a first portion of a gear end learning process.
Figure 6:
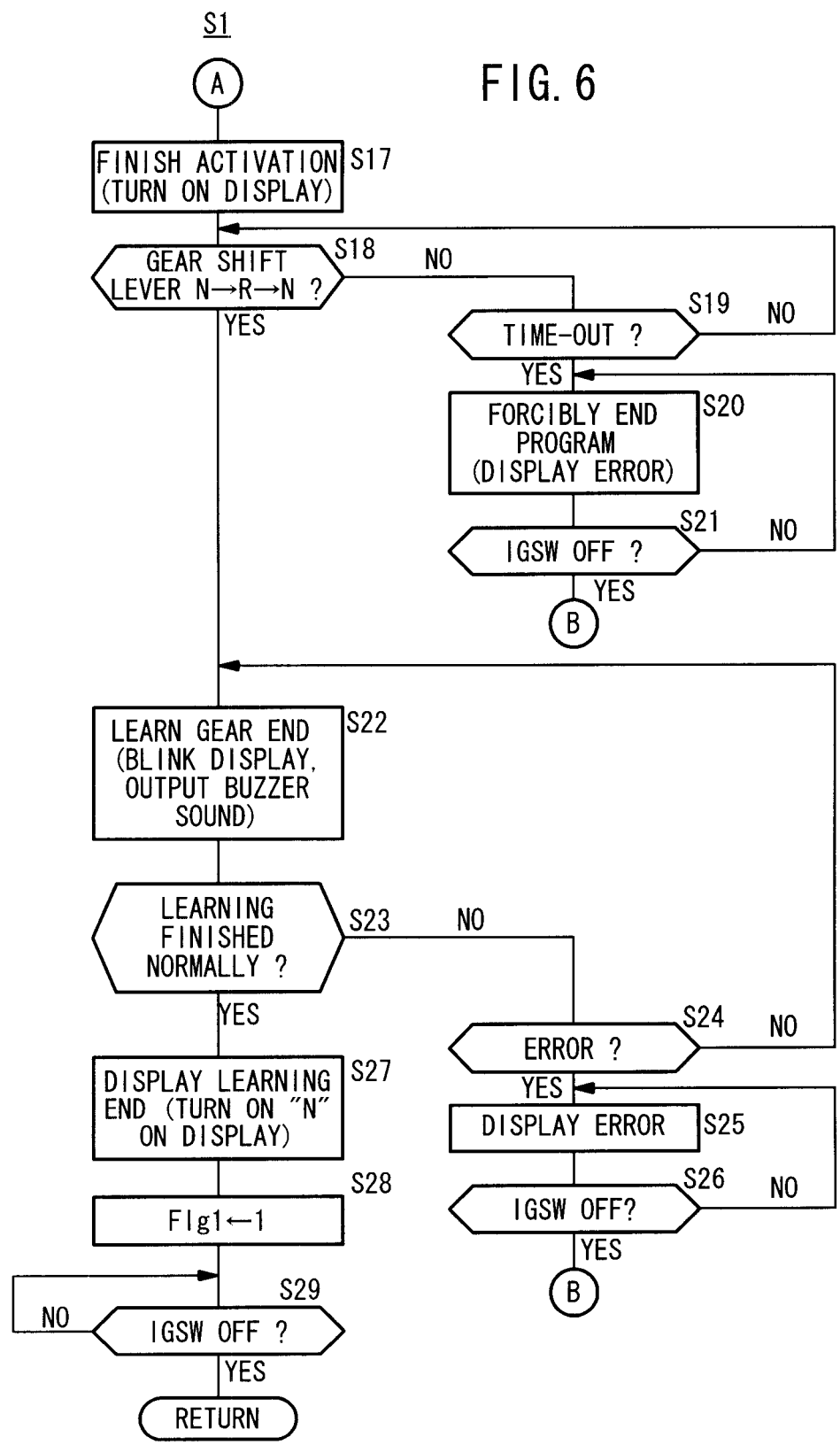
FIG. 6 is a detailed flowchart of a second portion of the gear end learning process.

FIGS. 5 and 6 are detailed flowcharts of the gear end learning process. In step S11 in FIG. 5, the TCU 26 determines whether or not the IGSW 60 is turned on based on an ignition signal Sig from the IGSW 60. If the IGSW 60 is not turned on (S11: No), then the TCU 26 repeats step S11.

If the IGSW 60 is turned on (S11: Yes), then the TCU 26 determines whether or not the TCU 26 is in a power-hold mode. The power-hold mode refers to a mode in which the TCU 26 is continuously turned on for a certain time in order to stop the vehicle 10 after the IGSW 60 has been turned off. The power-hold mode continues if the IGSW 60 is turned off and then immediately turned on. Although not shown in FIG. 5, a time period for judging that time-out has occurred for the entire gear end learning process begins to be measured. If, before the process shown in FIGS. 5 and 6 has ended, the time period becomes equal to or greater than a prescribed threshold value for judging that time-out has occurred, then an error is displayed. If the IGSW 60 is turned off, then control returns to step S11.

If the TCU 26 is in the power-hold mode in step S12 (S12: Yes), then in step S13, the TCU 26 displays on the control panel 68 an error indicating that the TCU 26 is in the power-hold mode, thus prompting the operator to turn off the IGSW 60. In step S14, the TCU 26 determines whether or not the IGSW 60 is turned off based on the ignition signal Sig. If the IGSW 60 remains turned on (S14: No), then control returns to step S13 and the error continues to be displayed. If the IGSW 60 is turned off (S14: Yes), then control returns to step S11.

In step S12, if the TCU 26 is not in the power-hold mode (S12: No), then in step S15, the TCU 26 determines whether or not the hand brake 62 is on and the shift lever 30 is in the neutral position P2, based on the hand brake signal Shd from the hand brake 62 and the shift lever signal Ssl from the shift lever 30.

If the hand brake 62 is not on or the shift lever 30 is not in the neutral position P2 (S15: No), then the TCU 26 repeats step S15. If the hand brake 62 is on and the shift lever 30 is in the neutral position P2 (S15: Yes), then in step S16, the TCU 26 activates the gear end learning program, which is stored in the memory 28. At this time, the TCU 26 blinks all of the segments of the gear position display unit 86 in order to show that the gear end learning program has been activated.

In step S17 shown in FIG. 6, when activation of the gear end learning program is finished, the TCU 26 turns on all of the segments of the gear position display unit 86. At this time, the TCU 26 starts to measure a time T1 for judging whether time-out has been reached.

In step S18, the TCU 26 determines whether or not the shift lever 30 has been moved in order from the neutral position P2, to the reverse position P3, and to the neutral position P2. If the shift lever 30 has not been moved in this order (S18: No), then in step S19, the TCU 26 determines whether time-out has been reached, i.e., whether the time T1 is equal to or greater than a threshold value TH_t1 for judging that time-out has occurred. If time-out has not been reached (S19: No), then control returns to step S18. If time-out has been reached (S19: Yes), then the TCU 26 forcibly ends the gear end learning process, and in step S20, displays an error on the control panel 68, so as to prompt the operator to turn off the IGSW 60. Then, in step S21, the TCU 26 determines whether or not the IGSW 60 has been turned on. If the IGSW 60 remains turned on (S21: No), then control returns to step S20. If the IGSW 60 has been turned off (S21: Yes), then control returns to step S11, thus restarting the gear end learning process.

In step S18, if the shift lever 30 has been moved in order from the neutral position P2, to the reverse position P3, and to the neutral position P2 (S18: Yes), then in step S22, the TCU 26 learns a gear end in each gear position. The TCU 26 learns a gear end by monitoring the shifting distance Asft, which is indicated by the shifting distance signal Sasft from the shift actuator 22, and the selecting distance Asel, which is indicated by the selecting distance signal Sasel from the select actuator 24, and by judging as the gear end a point where changes per unit time in the shifting distance Asft and the selecting distance Asel are equal to or smaller than prescribed threshold values. While learning of the gear end is carried out, the TCU 26 blinks all of the segments of the gear position display unit 86, and also outputs a buzzer sound from the speaker 70. Alternatively, instead of blinking all of the segments, the TCU 26 may blink a gear position in question.

In step S23, the TCU 26 determines whether or not learning of a gear end has finished normally. If learning of the gear end has not finished yet (S23: No), then in step S24, the TCU 26 determines whether or not an error has occurred in learning of the gear end. If an error has not occurred in learning of the gear end (S24: No), then control returns to step S22 and learning of the gear end is continued. If an error has occurred in learning of the gear end (S24: Yes), then in step S25, the TCU 26 displays the gear position that has suffered an error on the gear position display unit 86. For example, if a first gear position has suffered an error, then the TCU 26 displays a "1" on the gear position display unit 86. In step S26, the TCU 26 determines whether or not the IGSW 60 has been turned off. If the IGSW 60 remains turned on (S26: No), then control returns to step S25 so that the error continues to be displayed. If the IGSW 60 has been turned off (S26: Yes), then control returns to step S11.

In step S23, if learning of the gear end is completed normally (S23: Yes), then in step S27, the TCU 26 displays that learning of the gear end has been completed on the gear position display unit 86. More specifically, the TCU 26 displays an "N" on the gear position display unit 86, and also writes the learned gear end in the memory 28. In step S28, the TCU 26 changes a flag Flg1, which is stored in the memory 28 and indicates whether learning of the gear end has been completed, from "0" (indicating that gear end learning is possible) to "1" (indicating that gear end learning is not possible). The flag Flg1 is included in the gear end learning program. Therefore, the gear end learning program is partially rewritten by changing the value of the flag Flg1. In step S29, the TCU 26 determines whether or not the IGSW 60 has been turned off. If the IGSW 60 remains turned on (S29: No), then control returns to step S29. If the IGSW 60 has been turned off (S29: Yes), then the gear end learning process is brought to an end, after which control proceeds to step S2 shown in FIG. 4.

Figure 7:
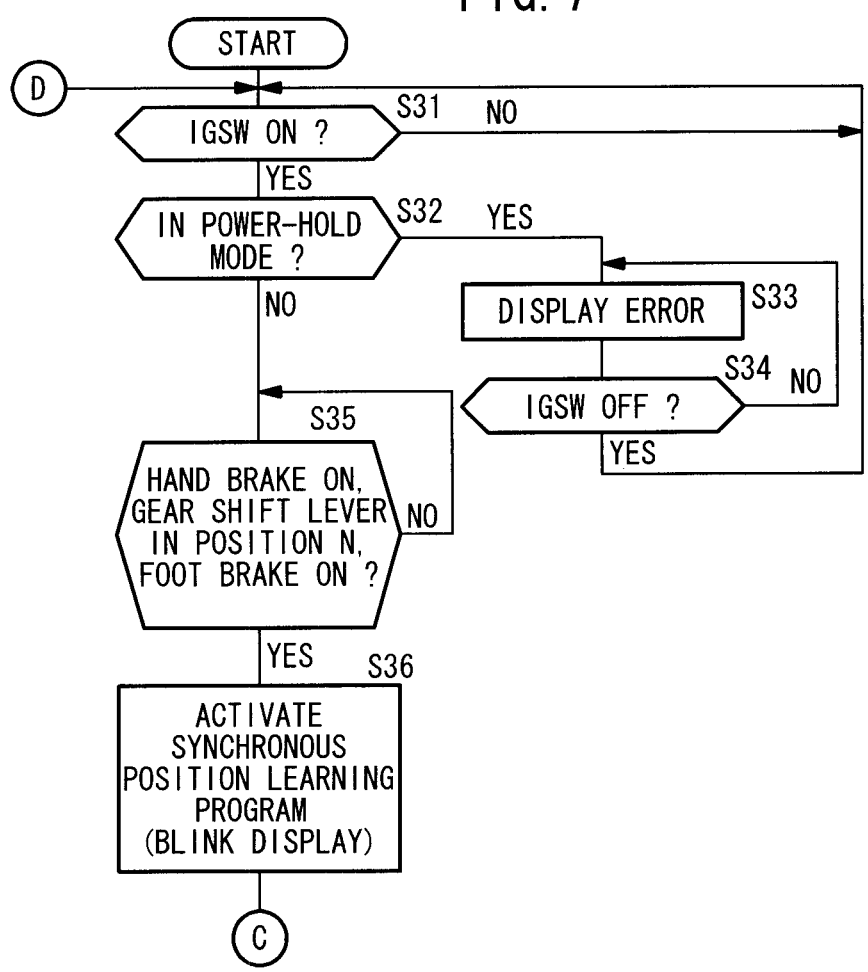
FIG. 7 is a detailed flowchart of a first portion of a synchronous position learning process.
Figure 8:
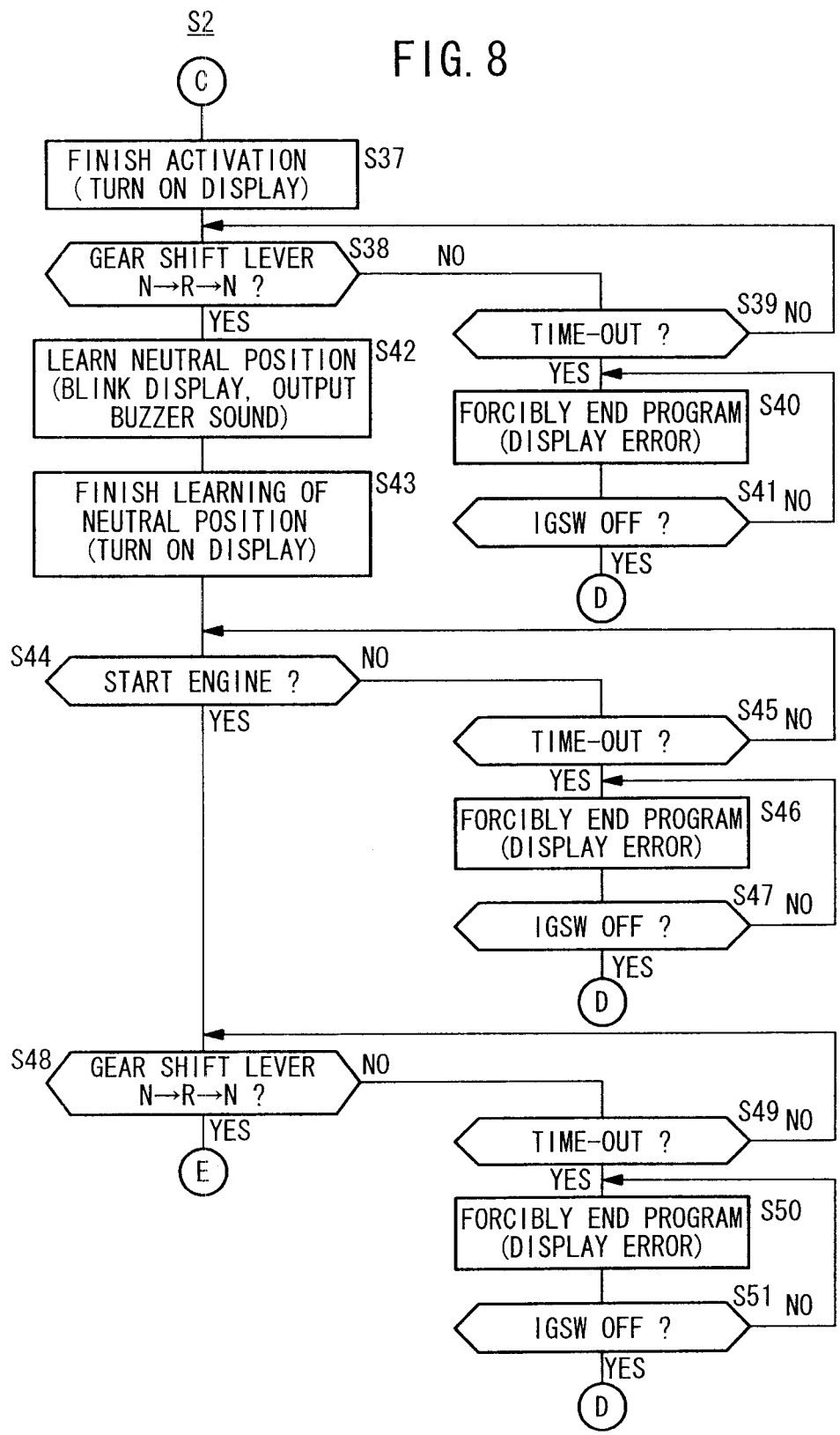
FIG. 8 is a detailed flowchart of a second portion of the synchronous position learning process.
Figure 9:
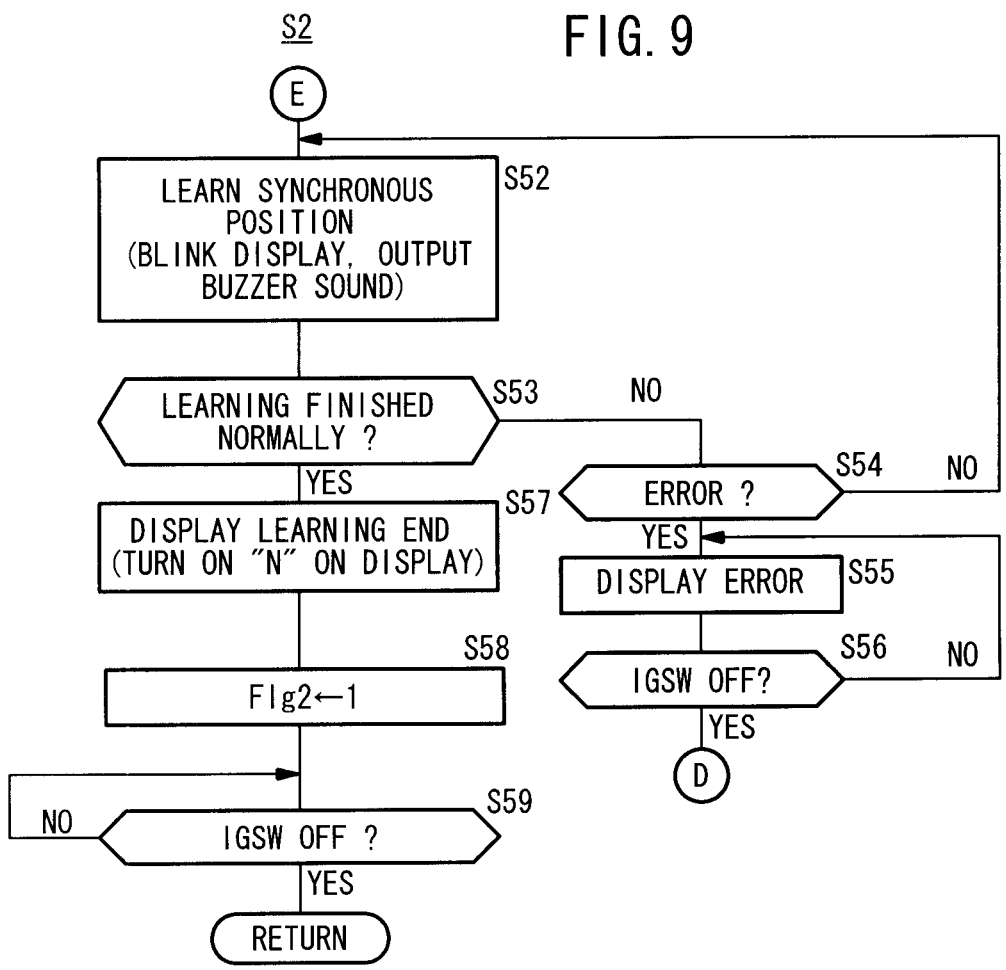
FIG. 9 is a detailed flowchart of a third portion of the synchronous position learning process.

FIGS. 7 through 9 are detailed flowcharts of the synchronous position learning process. Steps S31 through S34 shown in FIG. 7 are essentially the same as steps S11 through S14 shown in FIG. 5. Although not shown in FIG. 7, if the IGSW 60 has been turned on (S31: Yes), then a time period for judging whether time-out has been reached for the entire synchronous position learning process starts to be measured. If, before the process shown in FIGS. 7 through 9 comes to an end, this time period becomes equal to or greater than a prescribed threshold value for judging that time-out has occurred, then an error is displayed. If the IGSW 60 is turned off, then control returns to step S31.

If the TCU 26 is not in the power-hold mode in step S32 (S32: No), then the TCU 26 determines, in step S35, whether or not the hand brake 62 and the foot brake 64 are both on and the shift lever 30 is in the neutral position P2, based on the hand brake signal Shd from the hand brake 62, the shift lever signal Ssl from the shift lever 30, and the foot brake signal Sft from the foot brake 64. If the hand brake 62 or the foot brake 64 is not on, or if the shift lever 30 is not in the neutral position P2 (S35: No), then the TCU 26 repeats step S35.

If the hand brake 62 and the foot brake 64 are both on and the shift lever 30 is in the neutral position P2 (S35: Yes), then in step S36, the TCU 26 activates the synchronous position learning program, which is stored in the memory 28. At this time, the TCU 26 blinks all of the segments of the gear position display unit 86 as well as the automatic gear shifting mode display unit 88, in order to show that the synchronous position learning program is currently activated. In step S37 shown in FIG. 8, when activation of the synchronous position learning program is finished, the TCU 26 turns on all of the segments of the gear position display unit 86 and the automatic gear shifting mode display unit 88. At this time, the TCU 26 starts to measure a time T2 for judging whether time-out has been reached.

Steps S38 through S41 are essentially the same as steps S18 through S21 shown in FIG. 6. For judging that time-out has occurred in step S39, the TCU 26 uses a threshold value Th_t2.

In step S38, if the shift lever 30 has been moved in order from the neutral position P2, to the reverse position P3, and to the neutral position P2 (S38: Yes), then in step S42, the TCU 26 learns a neutral position with respect to the shift arm 42. The TCU 26 learns the neutral position, for example, by moving the shift arm 42 to a minimum value in the shifting direction (i.e., to a position most widely spaced from the shift forks 40) and to a minimum value or a maximum value in the selecting direction (i.e., to a position at which the shift arm 42 is moved as far as possible in the selecting direction), and by defining as the neutral position the position to which the shift arm 42 has been moved from the above position by prescribed distances in the shifting direction and the selecting direction. While learning the neutral position is carried out, the TCU 26 blinks all of the segments of the gear position display unit 86, and also outputs a buzzer sound from the speaker 70. When learning of the neutral position is finished in step S43, the TCU 26 stops outputting the buzzer sound, and turns on all of the segments of the gear position display unit 86. At this time, the TCU 26 starts to measure a time T3 for judging whether time-out has been reached.

In step S44, the TCU 26 determines whether or not the engine E has been started (by the operator operating the IGSW 60), based on an output signal from the engine rotational speed sensor 50 or the engine torque sensor 52. If the engine E has not been started (S44: No), then control proceeds step S45. Step S45 as well as steps S46 and S47 is the same as steps S39 through S41 shown in FIG. 8. For judging that time-out has occurred in step S45, the TCU 26 uses a threshold value Th_t3.

In step S44, if the engine E has been started (S44: Yes), then control proceeds step S48. Also, if the engine E has been started in step S44, the TCU 26 starts measuring a time T4 for judging whether time-out has been reached. Step S48 and steps S49 through S51 are the same as steps S38 through S41 shown in FIG. 8. For judging whether time-out has been reached in step S49, the TCU 26 uses a threshold value Th_t4.

In step S48, if the shift lever 30 has been moved in order from the neutral position P2, to the reverse position P3, and to the neutral position P2 (S48: Yes), then in step S52 shown in FIG. 9, the TCU 26 learns a synchronous position for each gear position. The TCU 26 learns a synchronous position, for example, by moving the shift arm 42 in the shifting direction and the selecting direction for each gear position, and judging as a synchronous position a position determined from the shifting distance signal Sasft, at a time that the engine torque TQe detected by the engine torque sensor 52 undergoes a prescribed change (reduction). While learning the synchronous position, the TCU 26 blinks all of the segments of the gear position display unit 86, and also outputs a buzzer sound from the speaker 70.

In step S53, the TCU 26 determines whether or not learning of a synchronous position has finished normally. If learning of the synchronous position is not finished yet (S53: No), then in step S54, the TCU 26 determines whether or not an error has occurred during learning of the synchronous position. If an error has not occurred during learning of the synchronous position (S54: No), then control returns to step S52, and learning of the synchronous position is continued. If an error has occurred during learning of the synchronous position (S54: Yes), then in step S55, the TCU 26 displays the gear position that has suffered an error on the gear position display unit 86. For example, if a second gear position has suffered an error, then the TCU 26 displays a "2" on the gear position display unit 86. In step S56, the TCU 26 determines whether or not the IGSW 60 has been turned off. If the IGSW 60 remains turned on (S56: No), then control returns to step S55 in order to keep displaying the error. If the IGSW 60 has been turned off (S56: Yes), then control returns to step S31.

In step S53, if learning of the synchronous position is finished normally (S53: Yes), then in step S57, the TCU 26 displays that learning of the synchronous position has been completed on the gear position display unit 86. More specifically, the TCU 26 displays an "N" on the gear position display unit 86, and also writes the learned synchronous position in the memory 28. In step S58, the TCU 26 changes a flag Flg2, which is stored in the memory 28 and which indicates whether learning of the synchronous position is finished, from "0" (indicating that synchronous position learning is possible) to "1" (indicating that synchronous position learning is not possible). The flag Flg2 is included in the synchronous position learning program. Therefore, the synchronous position learning program is partially rewritten by changing the value of the flag Flg2. In step S59, the TCU 26 determines whether or not the IGSW 60 has been turned off. If the IGSW 60 remains turned on (S59: No), then the TCU 26 repeats step S59. If the IGSW 60 has been turned off (S59: Yes), then the synchronous position learning process is brought to an end, after which control proceeds to step S3 shown in FIG. 4.

Figure 10:
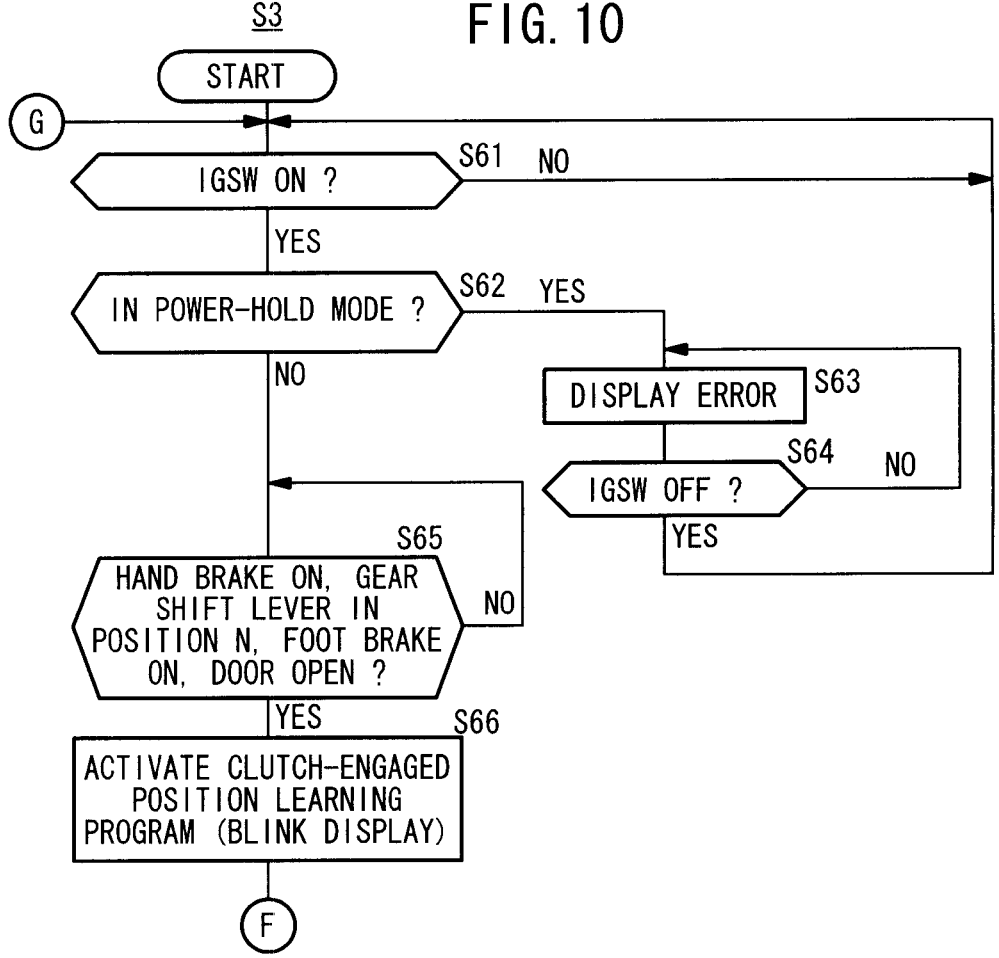
FIG. 10 is a detailed flowchart of a first portion of a clutch-engaged position learning process.
Figure 11:
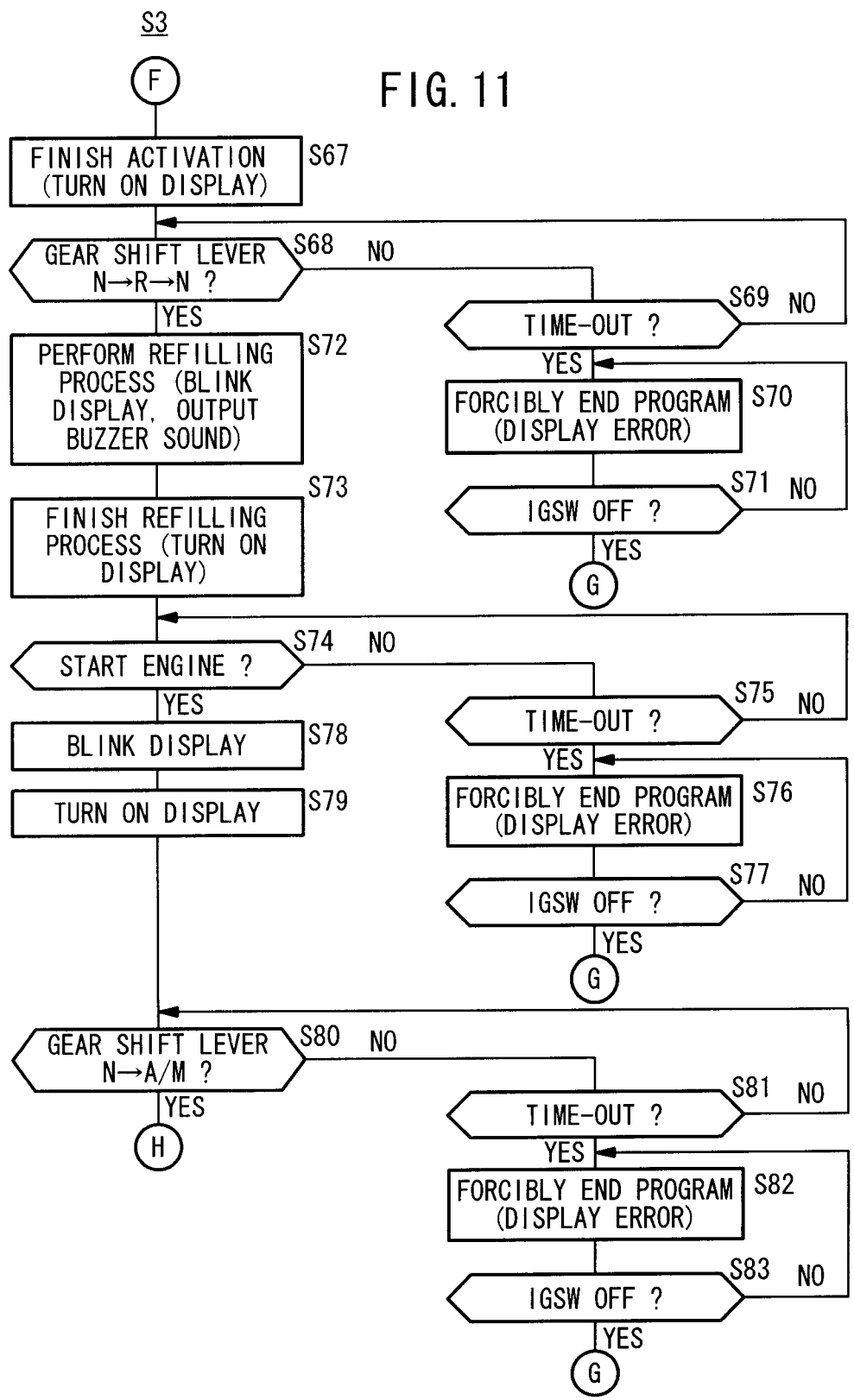
FIG. 11 is a detailed flowchart of a second portion of the clutch-engaged position learning process.
Figure 12:
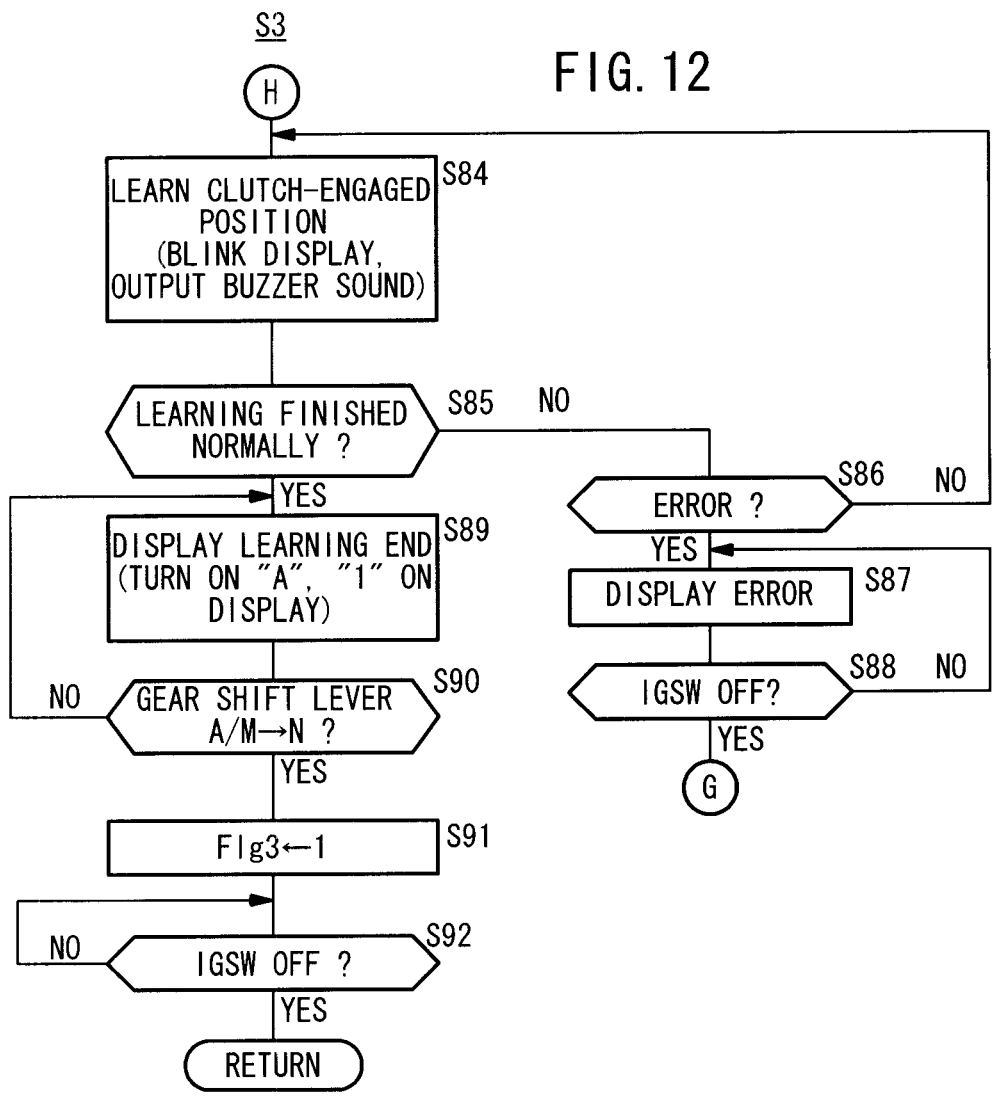
FIG. 12 is a detailed flowchart of a third portion of the clutch-engaged position learning process.

FIGS. 10 through 12 are detailed flowcharts of the clutch-engaged position learning process. Steps S61 through S64 shown in FIG. 10 are essentially the same as steps S11 through S14 shown in FIG. 5. Although not shown in FIG. 10, if the IGSW 60 is turned on (S61: Yes), then a time period for judging whether time-out has been reached for the entire clutch-engaged position learning process starts to be measured. If, before the process shown in FIGS. 10 through 12 is brought to an end, this time period becomes equal to or greater than a prescribed threshold value for judging that time-out has occurred, then an error is displayed. If the IGSW 60 is turned off, then control returns to step S61.

If the TCU 26 is not in the power-hold mode in step S62 (S62: No), then the TCU 26 determines, in step S65, whether or not the hand brake 62 and the foot brake 64 are both on, the shift lever 30 is in the neutral position P2, and the door 66 is open, based on the hand brake signal Shd from the hand brake 62, the shift lever signal Ssl from the shift lever 30, the foot brake signal Sft from the foot brake 64, and the door signal Sdo from the door 66. If the hand brake 62 or the foot brake 64 is not on, if the shift lever 30 is not in the neutral position P2, or if the door 66 is closed (S65: No), then the TCU 26 repeats step S65.

If the hand brake 62 and the foot brake 64 are both on, the shift lever 30 is in the neutral position P2, and the door 66 is open (S65: Yes), then in step S66, the TCU 26 activates the clutch-engaged position learning program, which is stored in the memory 28. At this time, the TCU 26 blinks all of the segments of the gear position display unit 86, in order to show that the clutch-engaged position learning program is currently activated. In step S67 shown in FIG. 11, when activation of the clutch-engaged position learning program is finished, the TCU 26 turns on all of the segments of the gear position display unit 86. At this time, the TCU 26 starts to measure a time T5 for judging whether time-out has been reached.

Steps S68 through S71 are essentially the same as steps S18 through S21 shown in FIG. 6. For judging that time-out has occurred in step S69, the TCU 26 uses a threshold value Th_t5.

In step S68, if the shift lever 30 has been moved in order from the neutral position P2, to the reverse position P3, and to the neutral position P2 (S68: Yes), then in step S72, the TCU 26 performs a refilling process. The refilling process refers to a process for opening the piston of a hydraulic cylinder in order to cancel the hydraulic pressure (remaining pressure) therein. During the refilling process, the TCU 26 blinks all of the segments of the gear position display unit 86, and also outputs a buzzer sound from the speaker 70. When the refilling process is finished in step S73, the TCU 26 stops outputting the buzzer sound and displays an "N" on the gear position display unit 86. At this time, the TCU 26 starts to measure a time T6 for judging whether time-out has been reached.

In step S74, the TCU 26 determines whether or not the engine E has been started (by the operator operating the IGSW 60), based on an output signal from the engine rotational speed sensor 50 or the engine torque sensor 52.

If the engine E has not been started (S74: No), then control proceeds to step S75. Step S75 as well as steps S76 and S77 is the same as steps S45 through S47 shown in FIG. 8. For judging whether time-out has occurred in step S75, the TCU 26 uses a threshold value Th_t6.

In step S74, if the engine E has been started (S74: Yes), then in step S78, the TCU 26 blinks all of the segments of the gear position display unit 86 for a prescribed startup time after the engine E has been started and until rotation of the engine E is stabilized. Upon elapse of the prescribed startup time, the TCU 26 turns on all of the segments of the gear position display unit 86 in step S79. At this time, the TCU 26 starts to measure a time T7 for judging whether time-out has been reached.

In step S80, the TCU 26 determines whether the shift lever 30 has been moved from the neutral position P2 to the position A/M. If the TCU 26 judges that the shift lever 30 has not been so moved (S80: No), then control proceeds to step S81. Step S81 as well as steps S82 and S83 is the same as steps S69 through S71 shown in FIG. 11. For judging whether time-out has occurred in step S81, the TCU 26 uses a threshold value Th_t7.

In step S80, if the shift lever 30 has been moved from the neutral position P2 to the position A/M (S80: Yes), then in step S84 shown in FIG. 12, the TCU 26 learns a clutch-engaged position. The TCU 26 learns the clutch-engaged position, for example, by judging as a clutch-engaged position a position that is indicated by the clutch position signal Scp at a time when the clutch torque TQc detected by the clutch torque sensor 54 undergoes a prescribed change (increase). While learning the clutch-engaged position, the TCU 26 blinks all of the segments of the gear position display unit 86, and also outputs a buzzer sound from the speaker 70.

In step S85, the TCU 26 determines whether or not learning of a clutch-engaged position has finished normally. If learning of the clutch-engaged position is not finished yet (S85: No), then in step S86, the TCU 26 determines whether or not an error has occurred during learning of the clutch-engaged position. If an error has not occurred during learning of the clutch-engaged position (S86: No), then control returns to step S84, and learning of the clutch-engaged position is continued. If an error has occurred during learning of the clutch-engaged position (S86: Yes), then in step S87, the TCU 26 turns on the automatic gear shifting mode display unit 88 and displays a "5" on the gear position display unit 86. In step S88, the TCU 26 determines whether or not the IGSW 60 has been turned off. If the IGSW 60 remains turned on (S88: No), then control returns to step S87 in order to keep displaying the error. If the IGSW 60 has been turned off (S88: Yes), then control returns to step S61.

In step S85, if learning of the clutch-engaged position is finished normally (S85: Yes), then in step S89, the TCU 26 displays that learning of the clutch-engaged position has been completed on the gear position display unit 86. More specifically, the TCU 26 turns on the automatic gear shifting mode display unit 88 and displays a "1" on the gear position display unit 86. The TCU 26 also writes the learned clutch-engaged position in the memory 28. In step S90, the TCU 26 determines whether or not the shift lever 30 has been changed from the position A/M to the neutral position P2. If the shift lever 30 remains in the position A/M (S90: No), then control returns to step S89. If the shift lever 30 has been changed from the position A/M to the neutral position P2 (S90: Yes), then the TCU 26 changes a flag Flg3, which is stored in the memory 28 and which indicates whether learning of the clutch-engaged position is finished, from "0" (indicating that clutch-engaged position learning is possible) to "1" (indicating that clutch-engaged position learning is not possible). The flag Flg3 is included in the clutch-engaged position learning program. Therefore, the clutch-engaged position learning program is partially rewritten by changing the value of the flag Flg3. In step S92, the TCU 26 determines whether or not the IGSW 60 has been turned off. If the IGSW 60 remains turned on (S92: No), then the TCU 26 repeats step S92. If the IGSW 60 has been turned off (S92: Yes), then the clutch-engaged position learning process is brought to an end, and hence the process shown in FIG. 4 also is brought to an end.

Figure 13:
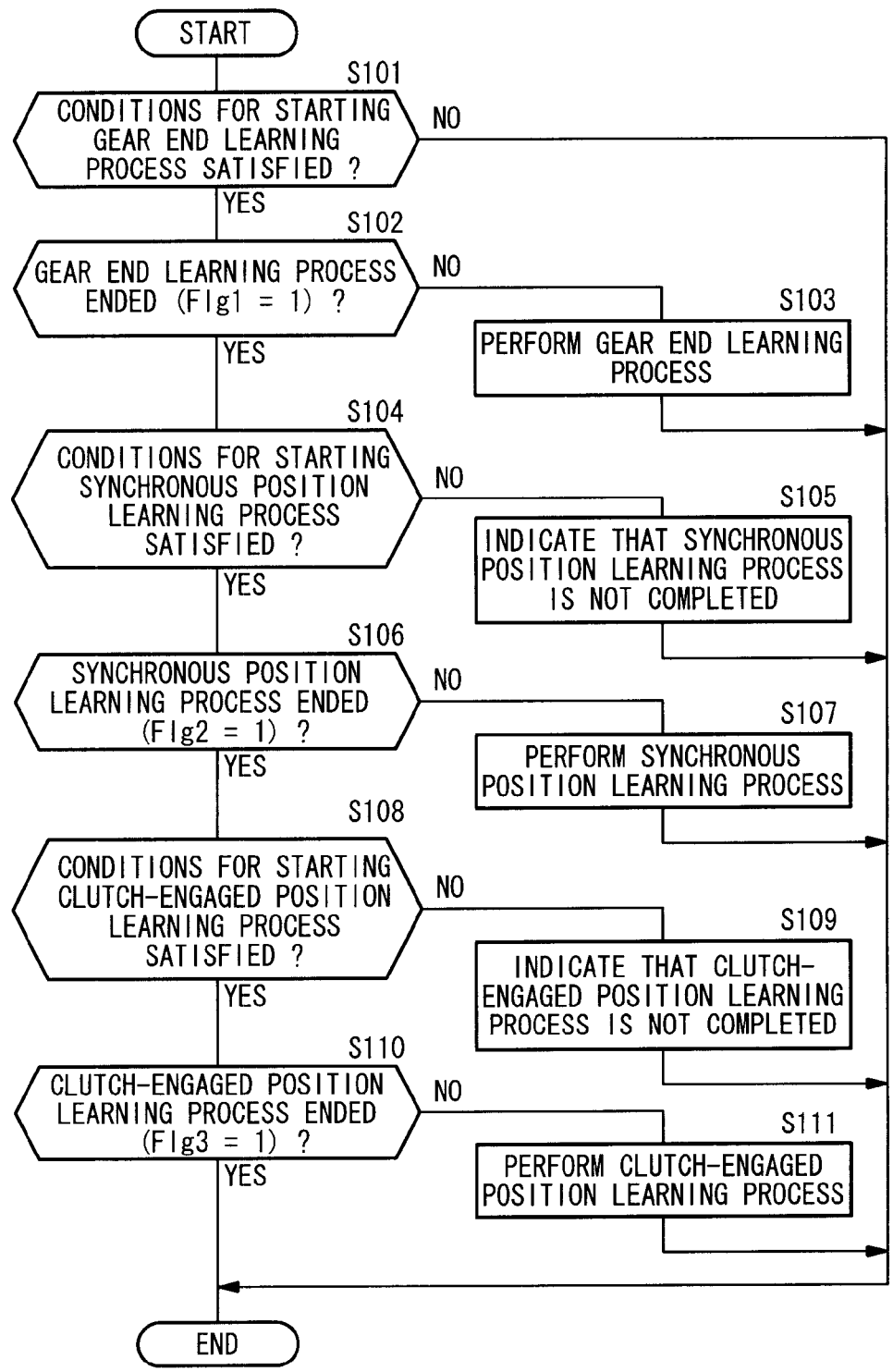
FIG. 13 is a flowchart of a process for inhibiting each reference position from being rewritten.

FIG. 13 is a flowchart of a process for inhibiting a gear end, a synchronous position, and a clutch-engaged position from being rewritten.

In step S101, the TCU 26 determines whether or not conditions (S11, S12, S15 in FIG. 5) for starting the gear end learning process are satisfied. If the starting conditions are not satisfied (S101: No), then the process is terminated. If the starting conditions are satisfied (S101: Yes), then control proceeds to step S102.

In step S102, the TCU 26 determines whether or not the gear end learning process has ended (whether the flag Flg1=1). If the gear end learning process has not ended (S102: No), then the TCU 26 continues to perform the gear end learning process in step S103. If the gear end learning process has ended (S102: Yes), then the TCU 26 does not perform a new gear end learning process, and control proceeds to step S104.

In step S104, the TCU 26 determines whether or not conditions (S31, S32, S35 in FIG. 7) for starting the synchronous position learning process are satisfied. If the starting conditions are not satisfied (S104: No), then in step S105, the TCU 26 indicates that the synchronous position learning process is not yet completed via the control panel 68 and the speaker 70. If the starting conditions are satisfied (S104: Yes), then control proceeds to step S106.

In step S106, the TCU 26 determines whether or not the synchronous position learning process has ended (whether the flag Flg2=1). If the synchronous position learning process has not ended (S106: No), then in step S107, the TCU 26 continues to perform the synchronous position learning process. If the synchronous position learning process has ended (S106: Yes), then the TCU 26 does not perform a new synchronous position learning process, and control proceeds to step S108.

In step S108, the TCU 26 determines whether or not conditions (S61, S62, S65 in FIG. 10) for starting the clutch-engaged position learning process are satisfied. If the starting conditions are not satisfied (S108: No), then in step S109, the TCU 26 indicates that the clutch-engaged position learning process is not yet completed via the control panel 68 and the speaker 70. If the starting conditions are satisfied (S108: Yes), then control proceeds to step S110.

In step S110, the TCU 26 determines whether or not the clutch-engaged position learning process has ended (whether the flag Flg3=1). If the clutch-engaged position learning process is not ended (S110: No), then in step S110, the TCU 26 continues to perform the clutch-engaged position learning process. If the clutch-engaged position learning process has ended (S110: Yes), then the TCU 26 does not perform a new clutch-engaged position learning process, and the process shown in FIG. 13 is brought to an end.

According to the present embodiment, as described above, when the operator performs a prescribed input action on the shift lever 30, the TCU 26 starts learning a gear end, a synchronous position, and a clutch-engaged position, respectively. Generally, the shift lever 30 is positioned where the driver can easily operate the shift lever 30. Therefore, the operator can enable the gear end, the synchronous position, and the clutch-engaged position to be learned through a simple process. As a result, compared with the process of learning a gear end, etc., with a control facility in a factory, or by means of a portable tester connected to the vehicle 10, the man-hours required for the learning process can be reduced since the transmission does not need to be installed and dismounted. Further, the degree of freedom in design is improved, because it unnecessary for the transmission 12 to have a connector.

According to the present embodiment, when the shift lever 30 is moved along a prescribed path (S18: Yes in FIG. 6, S48: Yes in FIG. 8, S80: Yes in FIG. 11), the TCU 26 starts learning a gear end, a synchronous position, and a clutch-engaged position (S22 in FIG. 6, S52 in FIG. 9, S84 in FIG. 12). Since the shift lever can stop at a plurality of positions, a relatively large number of paths along which the shift lever 30 may move can be established. Therefore, when a plurality of reference positions (a gear end, a synchronous position, and a clutch-engaged position) are to be learned, it is possible to have paths corresponding to the respective learning processes, with the result that the operator can easily distinguish between respective details of the learning processes.

According to the present embodiment, after a gear end, etc., has been learned, i.e. when learning thereof has ended, the gear end is prohibited from being learned again. Consequently, even though operations of the shift lever 30, which are used during driving the vehicle, are used as conditions for starting the learning processes, there is no possibility that the gear end, etc., will be rewritten while the driver is actually driving the vehicle.

According to the present embodiment, a gear end, etc., is prohibited from being learned again by rewriting the gear end learning program, the synchronous position learning program, and the clutch-engaged position learning program, after the learning processes thereof have come to an end. Accordingly, after having been learned, the gear end, the synchronous position, and the clutch-engaged position are prevented from being rewritten in error.

According to the present embodiment, the gear end learning process is started based on the condition that the hand brake 62 is on, and that the IGSW 60 is turned on while the shift lever 30 is in the neutral position P2 (S11: Yes and S15: Yes in FIG. 5). The synchronous position learning process is started based on the condition that the hand brake 62 and the foot brake 64 are on, and that the IGSW 60 is turned on while the shift lever 30 is in the neutral position P2 (S31: Yes and S35: Yes in FIG. 7). Therefore, conditions for starting the synchronous position learning process are the same as the conditions for starting the gear end learning process, with the additional condition that the foot brake 64 must be applied. Consequently, the operational procedure is not unduly complex, and management of the process is easy.

In the gear end learning process according to the present embodiment, a gear end is learned while the engine E is not in operation. In the synchronous position learning process, a synchronous position is learned while the engine E is in operation. Accordingly, a gear end can be learned while the hand brake 62 is applied to maintain the vehicle 10 in a stable condition, and a synchronous position can be learned while the hand brake 62 and the foot brake 64 are applied, thus making the vehicle 10 more stable.

While the gear end learning process, the synchronous position learning process, and the clutch-engaged position learning process according to the present embodiment are being prepared, the gear position display unit 86 is blinked. When preparations for the learning processes are brought to an end, the gear position display unit 86 is turned on. While the learning processes are being performed, the gear position display unit 86 is blinked. When the learning processes are brought to an end, the gear position display unit 86 is turned on. In the synchronous position learning process, the automatic gear shifting mode display unit 88 as well as the gear position display unit 86 is blinked and turned on. In the synchronous position learning process, the automatic gear shifting mode display unit 88 as well as the gear position display unit 86 is blinked and turned on. Therefore, the progress of each of the learning processes is indicated to the operator in a simple manner. Since the gear position display unit 86 and the automatic gear shifting mode display unit 88 are used to indicate the progress of the learning processes to the operator, the progress of the learning processes is indicated to the operator without causing the operator to feel any sense of discomfort. In the synchronous position learning process, since the automatic gear shifting mode display unit 88 as well as the gear position display unit 86 is blinked and turned on, the operator can recognize that the gear end learning process has ended.

According to the present embodiment, a gear end or a synchronous position starts to be learned (S22 in FIG. 6 and S52 in FIG. 9) when the shift lever 30 is moved in order from the neutral position P2, to the reverse position P3, and to the neutral position P2 (S18: Yes in FIG. 6 and S48: Yes in FIG. 8). Generally, the operator finds it more difficult to move the shift lever 30 into the reverse gear position P3 than into ordinary drive gear positions, such as the first gear position, the second gear position, etc. Accordingly, the condition of moving the shift lever 30 into the reverse gear position P3 requires the operator to perform the operation with a higher level of recognition.

According to the present embodiment, after learning of the gear end has ended, the gear end is prohibited from being relearned, and if the conditions for starting the gear end learning process are satisfied, even though learning of the gear end has ended, then it is indicated that a synchronous position should be learned (S105 in FIG. 13). After the learning of the synchronous position has ended, a synchronous position is prohibited from being relearned, and if the conditions for starting the synchronous position learning process are satisfied, even though learning of the synchronous position has ended, then it is indicated that a clutch-engaged position should be learned (S109 in FIG. 13). Consequently, once learning of the gear end or the synchronous position has ended, the gear end or the synchronous position is prohibited from being learned again, so that the gear end or the synchronous position, which has already been learned, is prevented from being rewritten unintentionally. If a learning process, which has already ended, is requested, then a next learning process to be performed is indicated to the operator, thereby prompting the operator to carry out the learning process.

The present invention is not limited to the above embodiment, but may employ various other arrangements based on the content of the present description. For example, the present invention may employ the following arrangements.

In the above embodiment, a gear end, a synchronous position, and a clutch-engaged position are used as reference positions for the transmission 12. However, either one or two of the above positions may be used. Other reference positions may be used as well.

In the above embodiment, the shift lever 30 is used as a device for manually entering a gear shift command. Instead, a paddle shift, for example, may be used. The number of times that the paddle shift is pushed may be used as a condition for starting the learning process.

In the above embodiment, the shift lever 30 is moved in order from the neutral position P2, to the reverse position P3, and to the neutral position P2, so as to satisfy the conditions for starting the gear end learning process. However, the present invention is not limited to these conditions. Similarly, the present invention is not limited to the conditions described above for starting the other reference position learning processes.

The invention claimed is:

1. A method of learning a plurality of reference positions for gears and a clutch of a transmission with a control unit of the transmission, the reference positions serving as references of operation for the gears and the clutch, the method comprising the steps of:
   carrying out processes of learning the reference positions after the transmission has been assembled in a vehicle body; and
   starting to learn the reference positions in the control unit when an operator moves a shift lever along prescribed paths, in the processes of learning the reference positions.

2. The method according to claim 1, wherein the reference position is prohibited from being learned again when learning of the reference position has ended.

3. The method according to claim 2, wherein the reference position is prohibited from being learned again by rewriting a program for learning the reference position after learning of the reference position has ended.

4. The method according to claim 1, further comprising the step of:
   blinking a display unit for indicating the position of the shift lever while the process of learning the reference position is being prepared, turning on the display unit when preparation of the process of learning the reference position has ended, blinking the display unit while the process of learning the reference position is being performed, and turning on the display unit when the process of learning the reference position has ended.

5. The method according to claim 1, wherein at least a first reference position and a second reference position are learned in the processes of learning the reference positions, and further comprising the steps of:
   requiring a hand brake to be applied and an ignition switch to be turned on while the shift lever is in a neutral position, as conditions for starting the process of learning the first reference position; and
   requiring the hand brake and a foot brake to be applied and the ignition switch to be turned on while the shift lever is in the neutral position, as conditions for starting the process of learning the second reference position after the process of learning the first reference position.

6. The method according to claim 5, further comprising the steps of:
   learning a gear end at which gears of the transmission are completely in mesh with each other, while an engine is not in operation, in the process of learning the first reference position; and
   learning a synchronous position at which the engine and the gears start rotating in synchronism with each other, while the engine is in operation, in the process of learning the second reference position.

7. The method according to claim 5, further comprising the steps of:
   blinking a display unit for indicating the position of the shift lever while the process of learning the first reference position and the process of learning the second reference position are being prepared, turning on the display unit when preparations of the process of learning the first reference position and the process of learning the second reference position have ended, blinking the display unit while the process of learning the first reference position and the process of learning the second reference position are being performed, and turning on the display unit when the process of learning the first reference position and the process of learning the second reference position have ended; and
   using, in the process of learning the second reference position, segments of the display unit that are not used in the process of learning the first reference position.

8. The method according to claim 1, further comprising the step of:
   starting to learn the reference positions when the shift lever is moved in order from a neutral position, to a reverse gear position, and to the neutral position.

9. The method according to claim 1, further comprising the steps of:
   after learning of a first reference position has ended, prohibiting the first reference position from being learned; and
   indicating that a second reference position should be learned if conditions for starting a process of learning the first reference position are satisfied, even though learning of the first reference position has ended.

10. A vehicle including a control unit for learning a plurality of reference positions for gears and a clutch of a transmission, the reference positions serving as references of operation for the gears and the clutch, wherein the control unit carries out processes of learning the reference positions when an operator moves a shift lever along prescribed paths, after the transmission has been assembled in a vehicle body.

* * * * *